United States Patent
Liao

(10) Patent No.: US 9,113,355 B2
(45) Date of Patent: Aug. 18, 2015

(54) METHOD OF HANDLING SIGNALING AND DATA TRANSMISSION FOR MACHINE-TYPE COMMUNICATION

(75) Inventor: Ching-Yu Liao, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 419 days.

(21) Appl. No.: 13/441,942

(22) Filed: Apr. 9, 2012

(65) Prior Publication Data

US 2012/0257571 A1    Oct. 11, 2012

Related U.S. Application Data

(60) Provisional application No. 61/472,639, filed on Apr. 7, 2011, provisional application No. 61/477,178, filed on Apr. 20, 2011, provisional application No. 61/482,194, filed on May 3, 2011, provisional application No. 61/482,222, filed on May 4, 2011, provisional application No. 61/539,965, filed on Sep. 27, 2011.

(51) Int. Cl.
*H04W 28/02*   (2009.01)
*H04W 4/00*    (2009.01)
*H04W 28/04*   (2009.01)
*H04W 88/16*   (2009.01)

(52) U.S. Cl.
CPC .......... *H04W 28/0247* (2013.01); *H04W 4/005* (2013.01); *H04W 28/04* (2013.01); *H04W 88/16* (2013.01)

(58) Field of Classification Search
CPC .................................................. H04W 4/005
See application file for complete search history.

(56) References Cited

U.S. PATENT DOCUMENTS

| | | | | |
|---|---|---|---|---|
| 2007/0275742 A1* | 11/2007 | Zhang | ........................... | 455/466 |
| 2008/0254776 A1* | 10/2008 | Ma | .............................. | 455/414.1 |
| 2009/0257412 A1* | 10/2009 | Kuokkanen | ................... | 370/338 |
| 2010/0124926 A1 | 5/2010 | Klatt | | |
| 2013/0136072 A1* | 5/2013 | Bachmann et al. | ........... | 370/329 |

FOREIGN PATENT DOCUMENTS

| | | |
|---|---|---|
| CN | 101632318 A | 1/2010 |
| EP | 2 192 807 A1 | 6/2010 |

OTHER PUBLICATIONS

3GPP TSG SA WG2 meeting # 79E Solution for congestion control for MTC mobile terminating communication Jul. 2010.*
European patent application No. 12002547.3, European Search Report mailing date: Sep. 6, 2012.

(Continued)

*Primary Examiner* — Gregory Sefcheck
*Assistant Examiner* — Rina Pancholi
(74) *Attorney, Agent, or Firm* — Winston Hsu; Scott Margo

(57) ABSTRACT

A method of handling signaling and data transmission for machine-type communication (MTC) for a network node in a mobile communication environment is disclosed. The method comprises receiving a non-access stratum (NAS) request message from a mobile communication device when the network control node is congested; and sending a trigger delivery failure report to a network gateway node in the core network to reject a trigger request message received from the network gateway node for triggering the mobile communication device.

6 Claims, 8 Drawing Sheets

(56) References Cited

OTHER PUBLICATIONS

HTC, "MTC device Reachability for Device trigger", 3GPP TSG SA WG2 Meeting #84, TD S2-111795, Apr. 11-15, 2011, Bratislava, Slovakia, XP002678180, pp. 1-2.
Samsung, "Solution for Congestion Control for MTC Mobile Terminating Communication", 3GPP TSG SA WG2 Meeting #79E, TD S2-103120, Jul. 6-13, 2010, Elbonia, XP050458206, pp. 1-4.
Huawei, Hisilicon, "Suppress MTC device triggering", 3GPP TSG SA WG2 Meeting #84, TD S2-111503, Apr. 11-15, 2011, Bratislava, Slovakia, XP050524453, pp. 1-2.
HTC, "Solution of Suppressing Device Trigger", SA WG2 Meeting #85, S2-112259, May 16-20, 2011, Xi'An, P.R. China, XP050525288, pp. 1-5.
3GPP TR 23.888 V1.1.0 (Mar. 2011), "3rdGeneration Partnership Project; Technical Specification Group Services and System Aspects; System Improvements for Machine-Type Communications; (Release 11)", XP050476300, pp. 1-94.
3GPP TR 23.888 V1.1.1 (Apr. 2011); Technical Report; 3rdGeneration Partnership Project; Technical Specification Group Services and System Aspects; System Improvements for Machine-Type Communications; (Release 11).
3GPP TS 23.401 V10.3.0 (Mar. 2011); Technical Specification; 3rd Generation Partnership Project; Technical Specification Group Services and System Aspects; General Packet Radio Service (GPRS) enhancements for Evolved Universal Terrestrial Radio Access Network (E-UTRAN) access; (Release 10).
HTC, Load/Overload Control via MTC-IWF, SA WG2 Meeting #87, S2-114674, Sep. 10-14, 2011, Jeju, Korea, p. 1-p. 5.
HTC, Intel, Panasonic, Samsung, ZTE, Proposed conclusion on overload handling for device triggering, SA WG2 Meeting #88, S2-115465, Nov. 14-18, 2011, San Francisco, USA, p. 1-p. 4.
Sierra Wireless, Verizon Wireless, Intel, Nokia Siemens Networks, LG Electronics, ZTE, Juniper Networks, Acision, Panasonic, Port of MTC Architecture Model from TR to TS, SA WG2 Meeting #88, S2-115468, Nov. 14-18, 2011, San Francisco, USA, p. 1-p. 8.
Ericsson, ST-Ericsson, "Triggering via PDN/PDP connection", 3GPP TSG SA WG2 Meeting #85, TD S2-112285, May 16-20, 2011, Xi'An, China, pp. 1-4.
3GPP TS 22.368 V11.1.0 (Mar. 2011), "3rd Generation Partnership Project; Technical Specification Group Services and System Aspects; Service requirements for Machine-Type Communications (MTC); Stage 1 (Release 11)", pp. 1-23.
3GPP TR 23.888 V1.4.0 (Aug. 2011), "3rdGeneration Partnership Project; Technical Specification Group Services and System Aspects; System Improvements for Machine-Type Communications; (Release 11)", pp. 1-139.
Panasonic et al., "Suppress MTC device triggering", 3GPP TSG-SA WG1 Meeting #53, S1-110414, Nashville, Tennessee, USA Feb. 14-18, 2011.
Panasonic et al., "Suppress MTC device triggering", 3GPP TSG-SA WG1 Meeting #53, S1-110053, Nashville, Tennessee, USA Feb. 14-18, 2011.

\* cited by examiner

METHOD OF HANDLING SIGNALING AND DATA TRANSMISSION FOR MACHINE-TYPE COMMUNICATION

CROSS REFERENCE TO RELATED APPLICATIONS

This application claims the benefit of U.S. Provisional Application No. 61/472,639, filed on Apr. 7, 2011, and entitled "Method of handling back-off status for device trigger", the benefit of U.S. Provisional Application No. 61/477,178, filed on Apr. 20, 2011, and entitled "Method of suppressing device trigger", the benefit of U.S. Provisional Application No. 61/482,194, filed on May 3, 2011, and entitled "Method of suppressing device trigger", the benefit of U.S. Provisional Application No. 61/482,222, filed on May 4, 2011, and entitled "Method of suppressing device trigger", and the benefit of U.S. Provisional Application No. 61/539,965, filed on Sep. 27, 2011 and entitled "Method of suppressing device trigger", the contents of which are incorporated herein.

BACKGROUND OF THE INVENTION

1. Field of the Invention

The present invention relates to a method utilized in a mobile communication environment, and more particularly, to a method of handling machine-type communication (MTC) in a mobile communication environment.

2. Description of the Prior Art

Machine-type communication (MTC) is one type of data communication including one or more entities not requiring human interactions. That is, the MTC refers to the concept of communication based on a network such as the existing GERAN, UMTS, long-term evolution (LTE), or the like used by a machine device instead of a mobile station (MS) used by a user. The machine device used in the MTC can be called an MTC device. There are various MTC devices such as a vending machine, a machine of measuring a water level at a dam, etc. That is, the MTC is widely applicable in various fields. The MTC device has features different from that of a typical MS. Therefore, a service optimized to the MTC may differ from a service optimized to human-to-human communication. In comparison with a current mobile network communication service, the MTC can be characterized as a different market scenario, data communication, less costs and efforts, a potentially great number of MSs for communication, wide service areas, low traffic per MS, etc.

Meanwhile, the number of MTC devices is expected to be much greater than the number of legacy devices, and a probability of performing operations of the plurality of MTC devices simultaneously is high due to a feature of atypical machine-to-machine (M2M) service. M2M communication (also referred to as "machine-type communications" or "MTC") maybe used in a variety of areas. In the area of security, M2M communication may be used in surveillance systems, in backup of telephone landlines, in the control of physical accesses (e.g. to buildings), and in car/driver security. In the area of tracking and tracing, M2M communication may be used for fleet management, order management, Pay As You Drive (PAYD) applications, asset tracking, navigation, traffic information applications, road tolling, traffic optimization, and steering. In the area of payment systems, M2M communication may be used in point of sales, vending machines, customer loyalty applications, and gaming machines. In healthcare, M2M communication may be used for remotely monitoring vital signs, supporting the elderly or handicapped, in web access telemedicine points, and in remote diagnostics. In the area of remote maintenance/control, M2M communication may be used in programmable logic controllers (PLCs), sensors, lighting, pumps, valves, elevator control, vending machine control, and vehicle diagnostics. In the area of metering, M2M communication may be used in applications related to power, gas, water, heating, grid control, and industrial metering. Additionally, M2M communication based on machine type communication (MTC) technology may be used in areas such as customer service.

M2M communications may take advantage of deployed wireless networks based on Third Generation Partnership Project (3GPP) technologies such as Global System for Mobile Communications (GSM), Universal Mobile Telecommunications System (UMTS), Long Term Evolution (LTE), Long Term Evolution Advanced (LTE-Advanced), and/or other technologies such as WiMAX (Worldwide Interoperability for Microwave Access) or those developed by the Institute for Institute of Electrical and Electronics Engineers (IEEE) and 3GPP2. M2M communications may use networks based on these technologies to deliver business solutions in a cost-effective manner. In a circumstance involving ubiquitous deployment of wireless networks, the availability of the wireless networks may facilitate and/or encourage the deployment and use of M2M devices. Additionally, further enhancements to these technologies may provide additional opportunities for the deployment of M2M-based solutions.

To receive services, e.g. evolved packet system (EPS) services, the UE needs to register with the network. During a registration procedure, e.g. attach procedure, the UE may first send an "ATTACH REQUEST" message to a network entity (e.g. MME). The "ATTACH REQUEST" message includes an international mobile subscriber identity (IMSI), which is stored in a subscriber identity module (SIM) card inside the mobile device, e.g. UE. Because the IMSI uniquely addresses each subscriber, it is seen as critical information from a security point of view and its transmission clearly has to be avoided as much as possible. By spying on and monitoring the IMSI, eavesdropper may track a subscriber's location, movement, and activities. So the network allocates a temporary UE identity, for example a system architecture evolution (SAE) temporary mobile subscriber identity (S-TMSI), to the UE and renews it frequently in order to reduce the use of IMSI.

According to 3GPP TS 23.401,, the network applies non-access stratum (NAS) level congestion control to avoid NAS signaling overload from massive UEs accessing the network in which the MME/serving GPRS support node (SGSN) provides a back-off timer to a requesting UE. When the back-off timer is running, the requesting UE is restricted from requesting subsequent EPS Mobility Management (EMM)/EPS Session Management (ESM) NAS signaling messages until the back-off timer expires.

In the prior art, the network lacks of a back-off status management mechanism for a back-off UE in which a back-off timer is running. For example, when the MTC server sends a trigger request message to the back-off UE, the network (e.g. MME/SGSN or HSS/HLR) would handle the trigger request message based on the EMM/EPS Connection Management (ECM) status of the back-off UE (i.e. a MTC device corresponding to the MTC server). The network may send trigger request message to the back-off UE or queue the trigger request message when the NAS level congestion control is applied. However, the MTC server does not get any response for the result of the trigger request message, such that the trigger request message is kept queued in the network. Network resources would be wasted and other trigger request messages for other non-back-off UEs may be delayed due to the queued trigger request message. Furthermore, if there is a validity timer in the trigger request message as indicated in 3GPP TR 23.888,, the trigger request message would be invalid due to expiration of the validity timer, and the MTC server would occupy the network resource to resend the trigger request message.

A Device Trigger Delivery Gateway could be a standalone physical entity or a functional entity. At least one Device Trigger Delivery Gateway is owned by and deployed in a HPLMN that supports the MTC device trigger feature for subscribed devices. The DT-GW is deployed on the boundary between the HPLMN and the public Internet. Alternatively, the DT-GW is owned and operated by a 3rd party on behalf of the HPLMN and/or deployed in the public Internet. In which case, a secure tunnelling mechanism between the DT-GW and the HPLMN is utilized.

The MTC server sends a trigger indication request to the appropriate DT-GW encapsulated in an IP packet. The trigger indication request could contain pertinent information needed to route the trigger (e.g. device subscriber identity, trigger command/arguments, relevant device location information, security parameters, etc.). When a trigger indication is received from a submitting node (e.g. an authorized MTC server or IWK function on behalf of the MTC server), the DT-GW should first authorize the received request; making sure it originated from a trusted MTC server and is targeted for a device for which the MTC server is authorized to trigger. The next step is for the DT-GW to determine the reachability of the MTC device. Per the requirements specified in clause 5.8, of 3GPP documentation TS 22.368, b.1.1,, a trigger-able MTC device can be received in the detached state, in the attached state without a publically routable PDP context/PDN connection and in the attached state with a publically routable PDP context/PDN connection.

When the MTC server sends trigger request for the target MTC device to the network, e.g. HSS/HLR or DT-GW/MTC-IWF, the network may not be able to process the trigger request due to network congestion. However due to lacking of network congestion information, it is still not clear how the network, e.g. HSS/HLR or DT-GW, suppresses the received trigger request or incoming trigger requests when network is congested.

SUMMARY OF THE INVENTION

It is therefore a primary objective of the present invention to provide method of handling machine-type communication (MTC) in a mobile communication environment.

The present disclosure discloses a method of handling machine-type communication (MTC) for a network control node in a mobile communication environment. The method comprises receiving a non-access stratum (NAS) request message from a mobile communication device when the network control node is congested; and sending a trigger delivery failure report to a network gateway node in the core network to reject a trigger request message received from the network gateway node for triggering the mobile communication device.

The present disclosure further discloses a method of handling signaling and data transmission, for example the signaling may be trigger related messages, for MTC in a network gateway node of a core network of a mobile communication system. The method comprises forwarding a trigger request message received from a MTC server to a network control node of the core network, wherein the first trigger request message is for triggering a mobile communication device; receiving a trigger delivery failure report from the network control node; and sending a second trigger delivery failure report to the MTC server in response to receiving the trigger delivery failure report.

The present disclosure further discloses a method of handling signaling and data transmission, for example the signaling may be trigger related messages, for MTC for a core network and a MTC server in a wireless communication system. The method comprises selectively performing suppress operation on a plurality of trigger requests.

These and other objectives of the present invention will no doubt become obvious to those of ordinary skill in the art after reading the following detailed description of the preferred embodiment that is illustrated in the various figures and drawings.

DETAILED DESCRIPTION

The following description is of the best-contemplated mode of carrying out the invention. This description is made for the purpose of illustrating the general principles of the invention and should not be taken in a limiting sense. Note that the 3GPP specifications described herein are used to teach the spirit of the invention, and the invention is not limited thereto.

Figure 1:
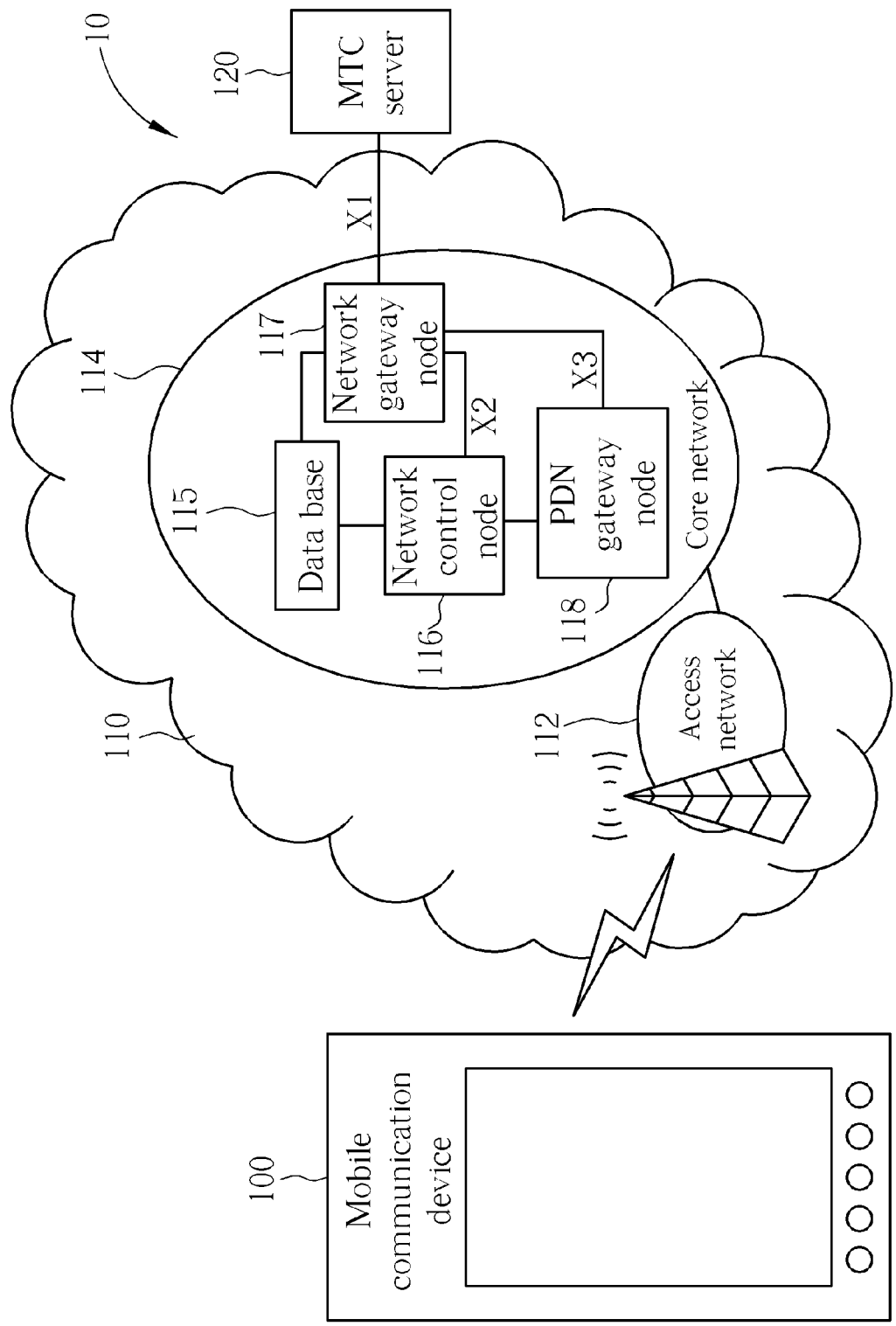
FIG. 1 is a schematic diagram of an exemplary mobile communication environment.

In order to solve the aforementioned problems, the invention provides methods for handling signaling and data transmission for MTC, where the signaling may be trigger related messages but not limited herein and the data transmission may be with small payload which is eligible for delivering via control plane. Please note that the signaling may be for MTC device with particular MTC features, e.g. MTC monitoring, MTC device triggering, etc. FIG. 1 is an exemplary system architecture for MTC (Machine Type Communication) which illustrates a mobile communication environment (or mobile communication system) 10 according to an embodiment of the invention. The mobile communication environment 10 includes at least one mobile communication device 100, a service network 110 and a MTC server 120. In the mobile communication environment 10, the mobile communication device 100, which may be a Mobile Station (MS)/User Equipment (UE), is wirelessly connected to the service network 110 for obtaining wireless services. The service network 110 comprises an access network (or called radio access network) 112 and a core network 114.

In the mobile communication environment 10, the mobile communication device 100 is configured for MTC and runs an application for MTC. The mobile communication device 100 may communicate with the MTC server 120 via the service network 110 which may be a 3GPP network, e.g. Global System for Mobile Communication (GSM) network, Universal Mobile Telecommunications System (UMTS) network, or Evolved Packet System (EPS) network. The MTC server 120 maybe a server capable of triggering MTC applications (also called MTC services) on the mobile communication device 100. The MTC server 120 can be further connected to one or more MTC application server via certain Application Programming Interfaces (API) and provides triggering services via the service network 110 for the connected MTC application servers. Specifically, the MTC server 120 can send a trigger request message (or called trigger indication) via the service network 110 to the mobile communication device 100 for executing specific MTC application(s).

The service network 110 may comprise an access network (or called radio access network) 112 and a core network 114, wherein the access network 112 allows connectivity between the mobile communication device 100 and the core network 114 by providing the functionality of wireless transmissions and receptions to and from the mobile communication device 100 for the core network 114, and the core network 114 signals the required operations to the access network 112 for providing wireless services to the mobile communication device 100. The service network 110 may be a network in compliance with the Global System for Mobile Communication (GSM), Universal Mobile Telecommunications System (UMTS), or Evolved Packet System (EPS) technology. The access network 112 may be a GSM Edge Radio Access Network (GERAN) in the GSM technology, a UMTS Terrestrial Radio Access Network (UTRAN) in the WCDMA/HSPA technology, or an Evolved-UTRAN (E-UTRAN) in the LTE/LTE-Advanced technology, and the core network 114 may be a GSM core network, a General Packet Radio Service (GPRS) core network in the GSM/UMTS system, or an Evolved Packet Core (EPC) network in the EPS system.

The core network 114 is connected to the access network 112, which may include a network control node 116 (e.g. SGSN/MME or S-GW or GGSN/PGW), a data base 115 (e.g. HSS/HLR), a PDN gateway node 118 and a network gateway node 117 (e.g. device trigger delivery gateway), for providing various services to the mobile communication device 100. Please note that the data base 115 can also co-located with the network gateway node 117. For example, the SGSN or MME/Service Gateway (S-GW) is the key network control node for packet routing and transfer, mobility management (e.g., attach/detach and location management), session management, logical link management, authentication and charging functions, and interfaces an E-UTRAN/UTRAN/GERAN for the creation of relevant radio bearers. The S-GW provides the mobile communication device 100 a direct user plane connectivity by being a bridge between the EUTRAN and, the PDN gateway node 118, and it has a control plan interface to the MME for handling mobile terminated calls to reach the mobile communication device 100 in idle mode. The GGSN or PDN gateway node 118 is responsible for inter-working between the UMTS or EPS network and external networks. The HSS or HLR is a central database that contains user-related and subscription-related information. HLR is responsible for enabling subscriber access, which can be considered as a subset of HSS. Functions of HSS/HLR include functionalities such as mobility management, call and session establishment support, user authentication and access authorization. The service-related entity, e.g. MTC server 120, may be inside or outside of the service network 110 and may indirectly connect to network entity, e.g. via network gateway or interworking function after appropriate authorization process, or directly connect to GGSN/PGW if user plane connection is established and remains active. Further, the core network 114 may provide different interfaces to the MTC server 120. The MTC server 120 may transmit a trigger message to the network gateway node 117 with interworking function to process service request, e.g. trigger service, received from the MTC server 120 for further trigger delivery, where the network gateway node 117 is an entry point of the service network 110 to the MTC server 120 and an intermediate network node to interface with SMS-SC (SMS service center) or network control node 116, e.g. MME/SGSN/MSC. Please note that the mobile communication device receives the trigger request message from network control node 116 via NAS signaling connection.

Figure 2A:
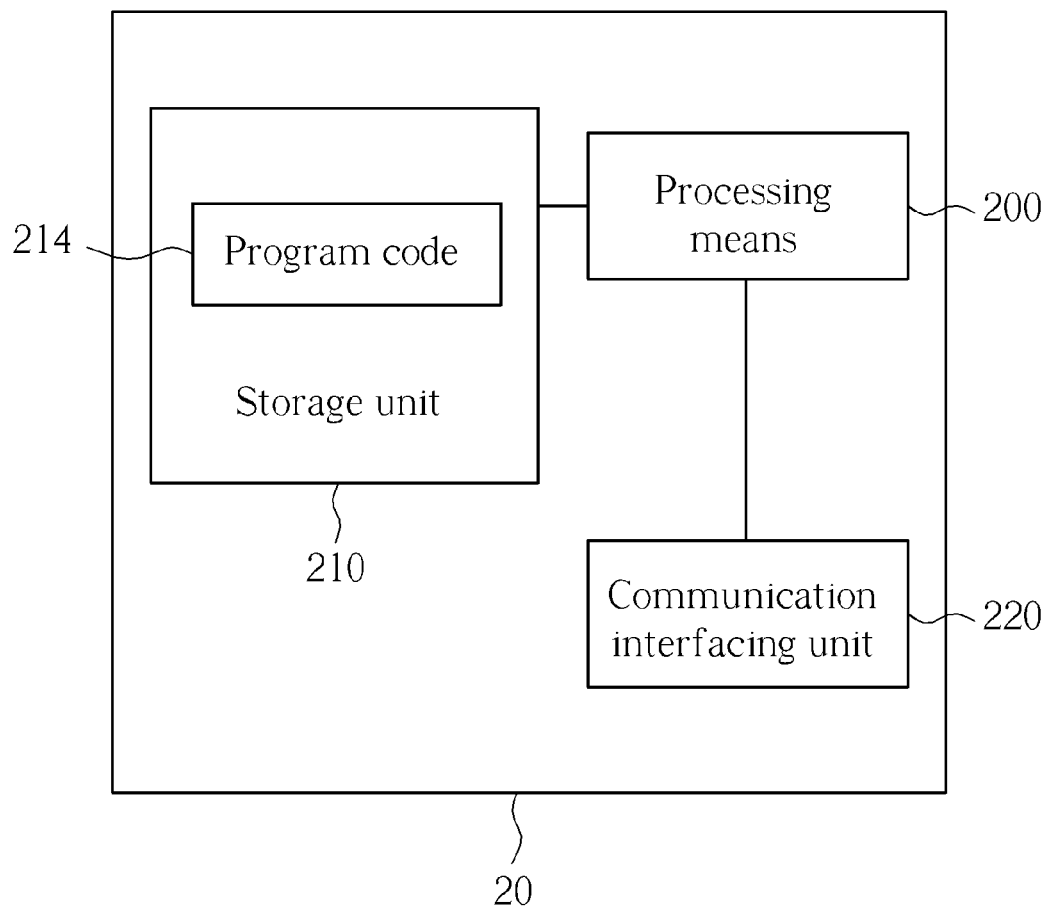
FIG. 2a, is a schematic diagram of an exemplary communication device.

FIG. 2a, illustrates a schematic diagram of an exemplary communication device 20. The communication device 20 may be implementation of the data base 115, the network control node 116, the network gateway node 117 or the MTC server 120 shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store program code 214, for access by the processing means 200. Examples of the storage unit 210 include but are not limited to a subscriber identity module (SIM), read-only memory (ROM), flash memory, random-access memory (RAM), CD-ROMs, magnetic tape, hard disk, and optical data storage device. The communication interfacing unit 220 is preferably a radio transceiver and can exchange wireless signals with the network according to processing results of the processing means 200.

Figure 2B:
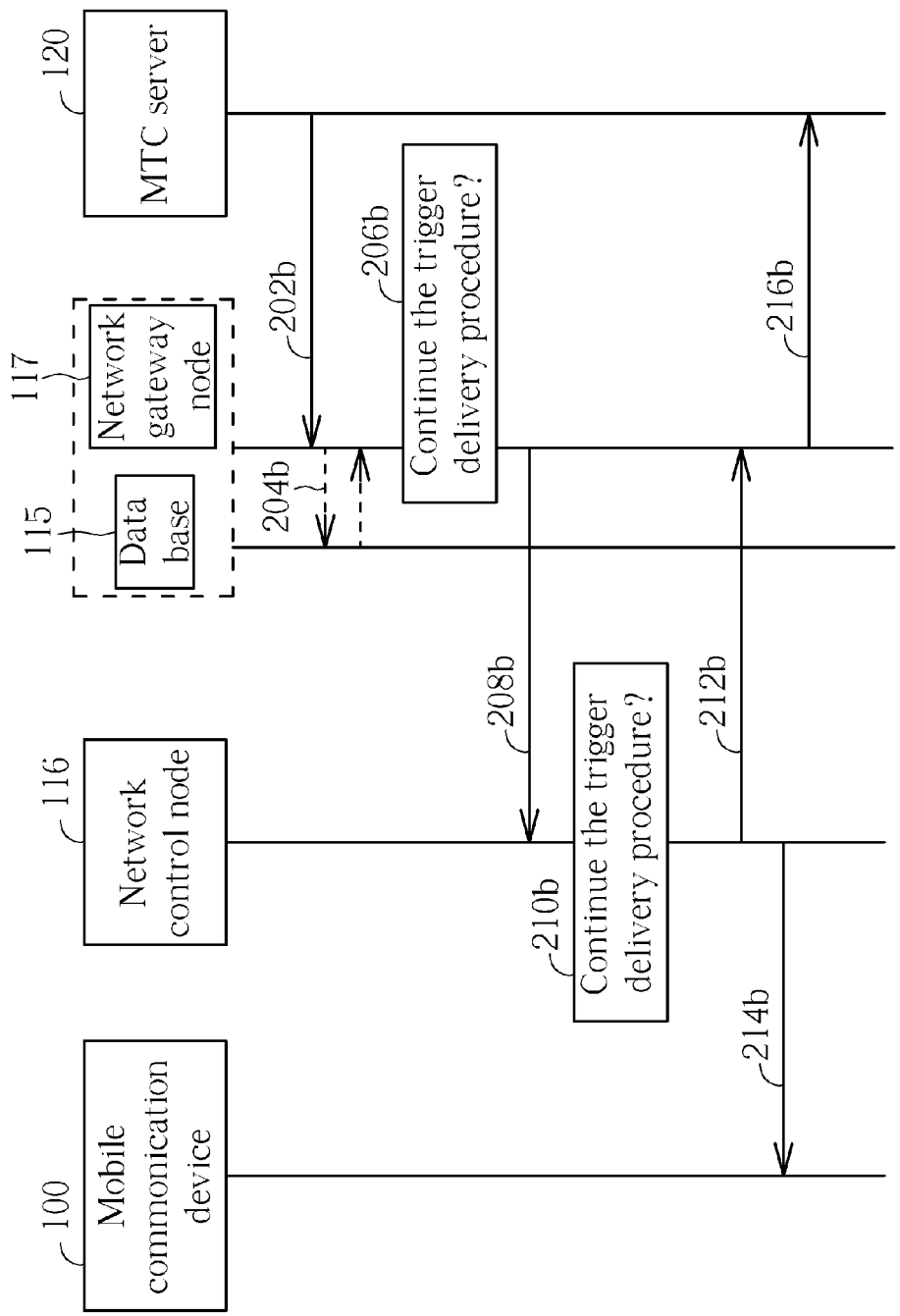
FIG. 2b, is a schematic diagram of an exemplary message flow sequence.

FIG. 2b, is an exemplary message flow diagram for MTC device for handling signaling and data transmission, for example the signaling may be trigger related messages, according to one embodiment of the present invention, which includes the following steps:

Step 202b: The MTC server 120 sends a trigger request to the network gateway node 117 via interface X1, where the trigger request is for triggering the mobile communication device 100.

Step 204b: The network gateway node 117 retrieves information of the network control node 116 (i.e. the network control node 116 is the serving network control node of the mobile communication device 100) from the data base 115 (e.g. HSS/HLR, please note that the network gateway node 117 can also be co-located with the data base 115 as indicated in FIG. 2b, indicates).

Step 206b: The network gateway node 117 determines if continuing the trigger delivery procedure. If no, the network gateway node 117 sends a trigger delivery failure report to the MTC server 120 via interface X1. If yes, go to step 208b.

Step 208b: The network gateway node 117 forwards the trigger request to the network control node 116 via interface X2.

Step 210b: The network control node 116 determines if continuing the trigger delivery procedure to send the trigger request to the mobile communication device 100.

Step 212b: If no, the network control node 116 sends a trigger delivery failure report to the network gateway node 117 via interface X2.

Step 214b: If yes, the network control node 116 sends the trigger request to the mobile communication device 100.

Step 216b: The network gateway node 117 forwards received trigger delivery failure report to the MTC server 120 via interface X1.

Please note that the trigger delivery failure report is the message that indicates the failure delivery of trigger request, the message can also be a reject message or an acknowledgement message in response to the trigger request message.

Figure 3:
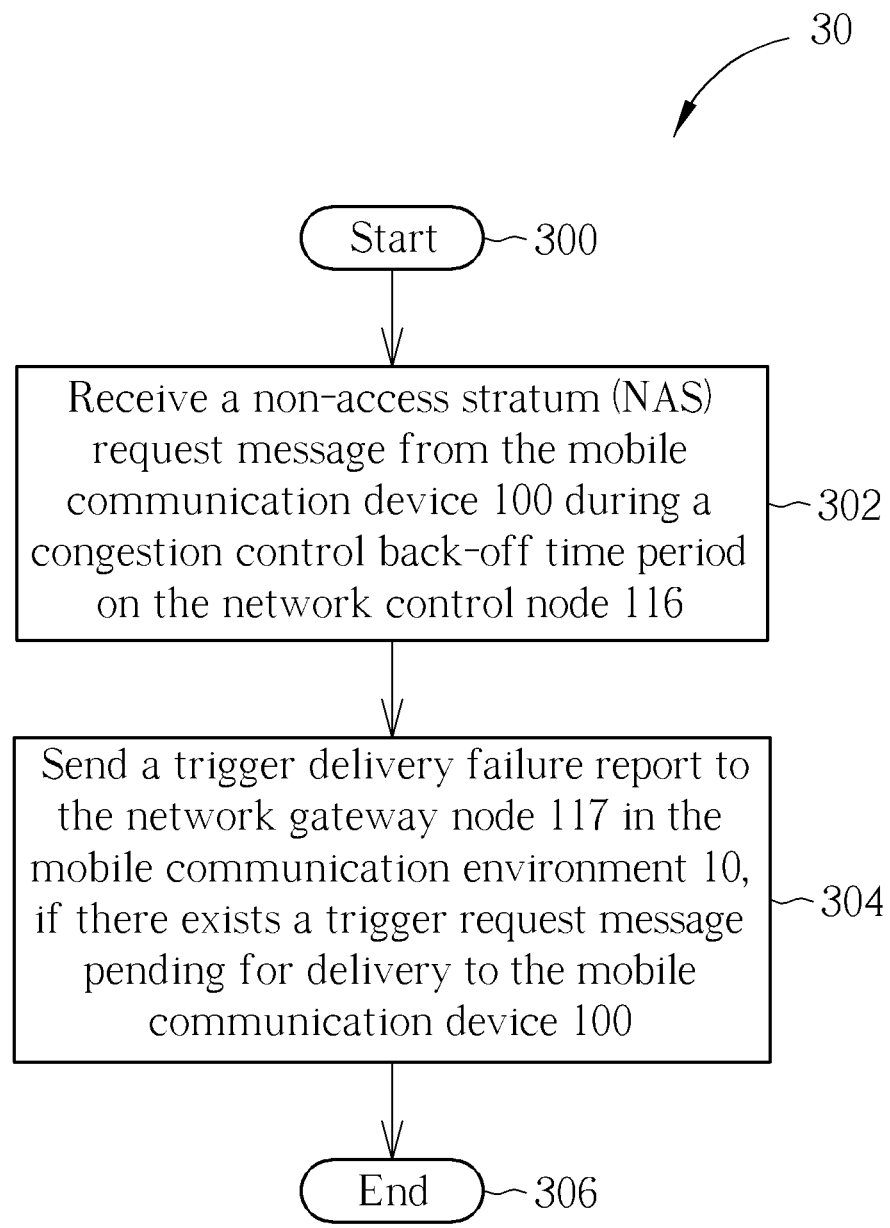
FIGS. 3-7 are flowchart diagrams of exemplary processes.

FIG. 3 is a flowchart diagram of an exemplary process 30 of the present invention. The process 30 is used for MTC for handling signaling and data transmission, for example the signaling may be trigger related messages, in the network control node 116. The process 30 may be compiled into the program code 214, including the following steps:

Step 300: Start.

Step 302: Receive a non-access stratum (NAS) request message from the mobile communication device 100 during a congestion control back-off time period on the network control node 116.

Step 304: Send a trigger delivery failure report to the network gateway node 117 in the mobile communication environment 10, if there exists a trigger request message pending for delivery to the mobile communication device 100.

Step 306: End.

According to the process 30, when the network control node 116 receives a NAS request message (e.g. ATTACH/TAU/SERVICE REQUEST) from the mobile communication device 100 during a congestion control back-off time period on the network control node 116, if there exists a trigger request message pending for delivery to the mobile communication device 100, the network control node 116 rejects the trigger request message by sending a trigger delivery failure report (or called trigger reject message) to the network gateway node 117, to notify the MTC server 120 that the mobile communication device 100 is currently unable to be triggered. The congestion control back-off time period starts when the network control node 116 activates NAS level congestion control to reject NAS level signaling requests (e.g. ATTACH/TAU/SERVICE REQUEST) under a network congestion situation or an access point name (APN) based congestion situation.

The trigger delivery failure report may include a failure cause (e.g. network congestion or congested APN information) according to the type of NAS level congestion control. Additionally, the network control node 116 may further send a NAS reject message with a NAS back-off timer to the mobile communication device 100, to inform the mobile communication device 100 that NAS level signaling requests are rejected and no further NAS level signaling request is allowed until the NAS back-off timer expires.

When the network gateway node 117 receives the trigger delivery failure report from the network control node 116, it determines the handling of the trigger request message. The network gateway node 117 may determine to keep storing the trigger request message for further delivery later on or directly forward the trigger delivery failure report to the MTC server 120.

If a UE reachability flag, e.g. message waiting flag, URRP-MME parameter, etc., is set on the network control node 116, the network control node 116 does not inform the data base 115 or the network gateway node 117 about the reachability status of the mobile communication device 100, where the network gateway node 117 may be a device trigger delivery gateway with interworking function and store and forward function for trigger request messages.

Figure 4:
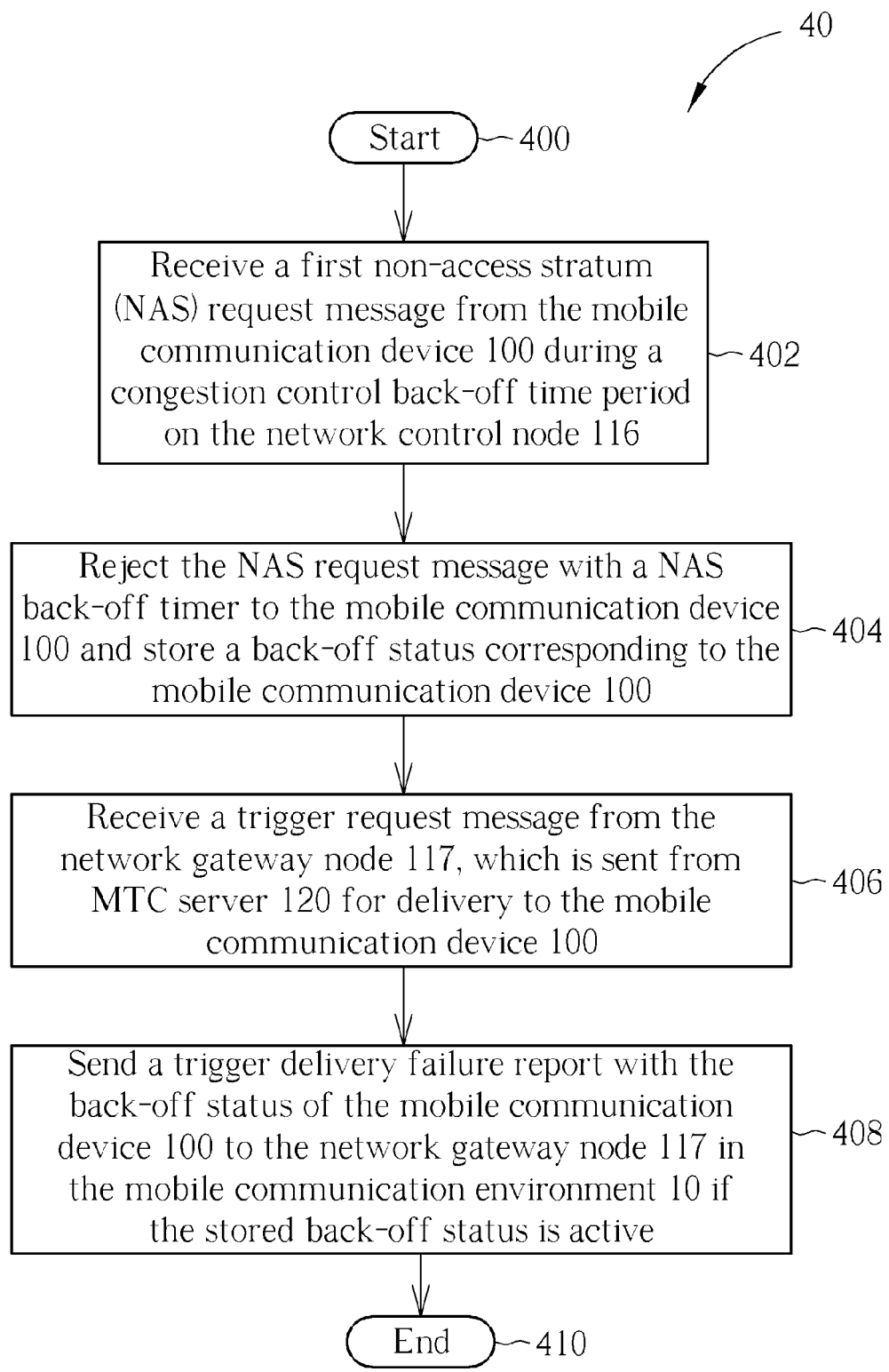

FIG. 4 is a flowchart diagram of an exemplary process 40 of the present invention. The process 40 is used for MTC for handling signaling and data transmission, for example the signaling may be trigger related messages, in the network control node 116. The process 40 maybe compiled into the program code 214, including the following steps:

Step 400: Start.

Step 402: Receive a first non-access stratum (NAS) request message from the mobile communication device 100 during a congestion control back-off time period on the network control node 116.

Step 404: Reject the NAS request message with a NAS back-off timer to the mobile communication device 100 and store a back-off status corresponding to the mobile communication device 100.

Step 406: Receive a trigger request message from the network gateway node 117, which is sent from MTC server 120 for delivery to the mobile communication device 100.

Step 408: Send a trigger delivery failure report with the back-off status of the mobile communication device 100 to the network gateway node 117 in the mobile communication environment 10 if the stored back-off status is active.

Step 410: End.

According to the process 40, when the network control node 116 receives the first NAS request message (e.g. ATTACH/TAU/SERVICE REQUEST) during the congestion control back-off time period on the network control node 116, the network control node 116 rejects the first NAS request message by sending a NAS reject message (e.g. ATTACH/TAU/SERVICE REJECT) including the NAS back-off timer IE, e.g. T3346, as indicated in 3GPP TS 24.301, and TS 24.008,, which is a random value generated by the network control node 116, to the mobile communication device 100 and stores a back-off status (i.e. set the back-off status as active) or the NAS back-off timer corresponding to the mobile communication device 100. The congestion control back-off time period starts when the network control node 116 activates NAS level congestion control to reject NAS level signaling requests under a network congestion situation or an APN based congestion situation. The value of the congestion control back-off time period is determined by the network node 116 and the NAS level MM signaling requests are not allowed by the network node 116 in a predetermined time. If congestion situation is released before congestion control back-off time period expires, the network control node 116 deactivates the congestion control back-off time period and stops congestion control on NAS level MM signaling. When receiving the NAS reject message, the mobile communication device 100 starts the NAS back-off timer. When the NAS back-off timer is running, the mobile communication device 100 is restricted from initiating any NAS level Mobility management signaling which is not for emergency services or priority services. The back-off status indicates that device trigger for the mobile communication device 100 is not allowed before expiry of the NAS back-off timer on the mobile communication device 100. Note that, the network control node 116 receives the trigger request message after rejecting the NAS request message with a NAS back-off timer to the mobile communication device 100. Therefore in response to the received trigger request message, the network control node 116 can respond to network gateway node 117 based on the stored back-off status or stored NAS back-off timer of the mobile communication device 100.

When the network control node 116 receives the trigger request message forwarded by the network gateway node 117, if the NAS back-off status of the mobile communication device 100 is set as active and the congestion control back-off time period is not expired, the network control node 116 sends the trigger delivery failure report with the back-off status to the network gateway node 117 to reject the trigger request message, where the trigger delivery failure report may include a failure cause (e.g. network congestion or congested APN information) according to the type of NAS level congestion control. That is, if the back-off status is active, the network gateway node 117 is restricted from forwarding the trigger request message to the congested network control node 116. Please note that the back-off status may be a flag indicating the back-off status of the mobile communication device 100 with regard to the NAS signaling or may be a trigger back-off timer indicating the forbidden time to receive trigger request message on the network control node 116, where the trigger back-off timer can be the remaining time of the NAS back-off timer of the mobile communication device 100 if the network control node 116 stores the NAS back-off timer which was sent to the mobile communication device 100 in the NAS reject message or a new back-off timer generated by the network control node 116 according to the congestion situation at the time receiving trigger request message if the network control node 116 does not store the NAS back-off timer of the mobile communication device 100. That is, before expiration of the trigger back-off timer, the back-off status of the mobile communication device 100 is regarded as active and the network gateway node 117 is restricted from forwarding the trigger request message to the mobile communication device 100.

When the network gateway node 117 receives the trigger delivery failure report from the network control node 116, it determines the handling of the trigger request message. The network gateway node 117 may determine to store the trigger request message for further delivery later on, e.g. forward the trigger request message after expiry of the NAS back-off timer or trigger back-off timer, or may directly forward the trigger delivery failure report to the MTC server 120 corresponding to the trigger request message. When receiving the trigger delivery failure report from the network gateway node 117, the MTC server 120 is restricted from sending any trigger request message to the mobile communication device 100 until the trigger back-off timer expires.

Furthermore, when the network control node 116 receives a second NAS request message which may be related to the inactive NAS back-off status, NAS back-off timer expiration, trigger back-off timer expiration, emergency service, priority service or mobile terminated services, the network control node 116 accepts the second NAS request message and clears the back-off status, i.e. the back-off status becomes inactive.

Preferably, the network control node 116 herein is a MME/SGSN/MSC, and the network gateway node 117 receiving the trigger request message from the MTC server 120 is a network gateway node 117, e.g. device trigger delivery gateway, with interworking function which may be co-located with HSS/HLR.

Figure 5:
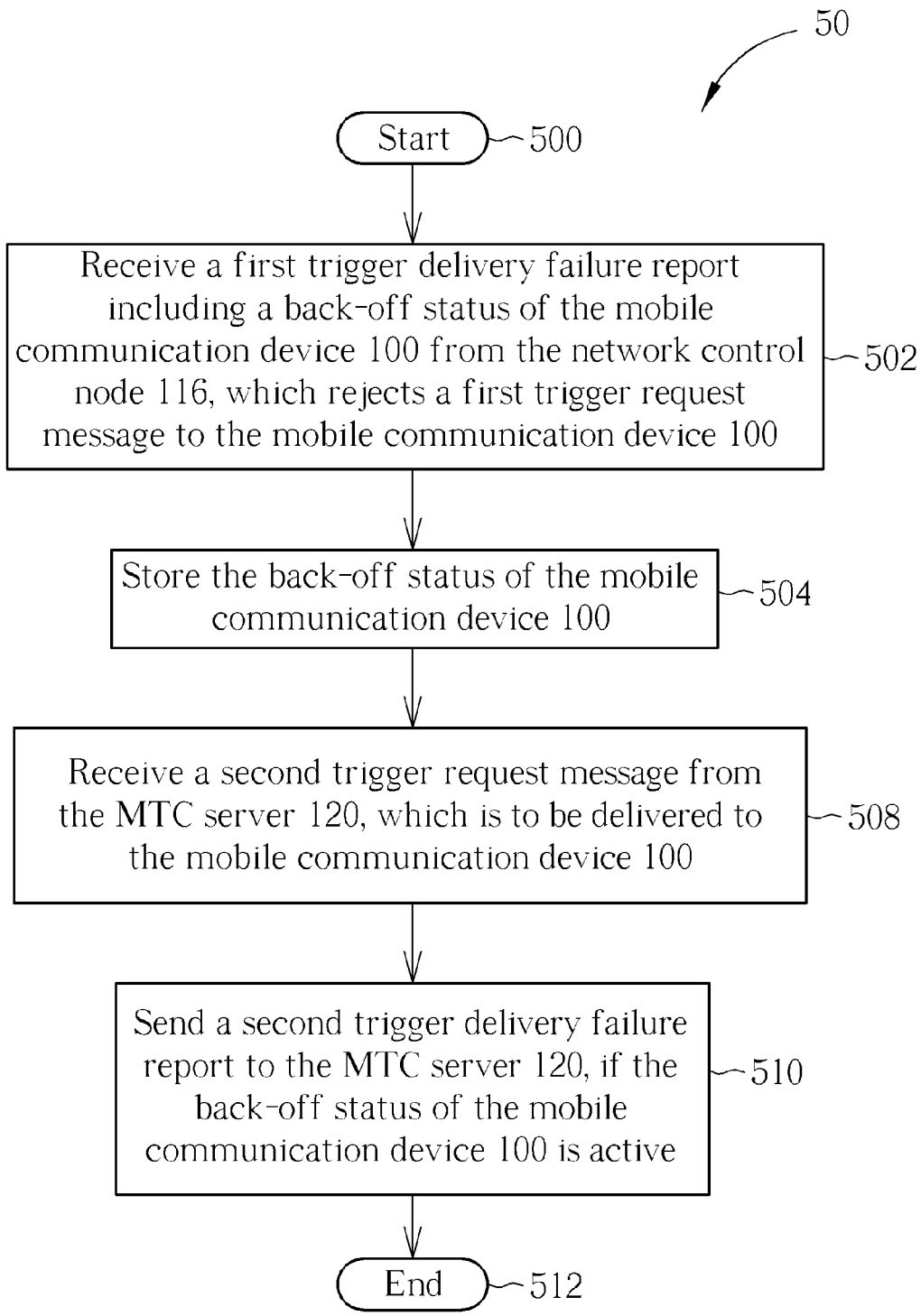

FIG. 5 is a flowchart diagram of an exemplary process 50 of the present invention. The process 50 is used for MTC for handling signaling and data transmission, for example the signaling may be trigger related messages, in the network gateway node 117. The process 50 maybe compiled into the program code 214, including the following steps:

Step 500: Start.

Step 502: Receive a first trigger delivery failure report including a back-off status of the mobile communication device 100 from the network control node 116, which rejects a first trigger request message to the mobile communication device 100.

Step 504: Store the back-off status of the mobile communication device 100.

Step 508: Receive a second trigger request message from the MTC server 120, which is to be delivered to the mobile communication device 100.

Step 510: Send a second trigger delivery failure report to the MTC server 120, if the back-off status of the mobile communication device 100 is active.

Step 512: End.

According to the process 50, when the network gateway node 117 receives from the network control node 116 the first trigger delivery failure report, which includes the back-off status the mobile communication device 100 is in back-off state, the network gateway node 117 stores the back-off status for subsequent operations.

When the network gateway node 117 receives a second trigger request message from the MTC server 120, which is to be delivered to the mobile communication device 100, the network gateway node 117 checks the back-off status which may be a flag or a trigger back-off timer corresponding to the mobile communication device 100. If the back-off status is active or the trigger back-off timer has not expired yet, the network gateway node 117 sends the second trigger delivery failure report with the back-off status indicating the active state by the flag or a back-off timer to the MTC server 120. Note that the back-off timer here maybe the remaining time of the trigger back-off timer or may also be a new value generated by the network gateway node 117 according to network load conditions. The second trigger delivery failure report may have a failure cause (e.g. network congestion or congested APN information) according to the type of NAS level congestion control.

The MTC server 120 may send another trigger request message to the mobile communication device 100 after the received back-off status becomes inactive or the back-off timer expires. Preferably, the network gateway node 117 herein is a gateway with interworking function for trigger delivery which may be co-located with HSS/HLR and may be with store and forward function for the trigger requests.

Figure 6:
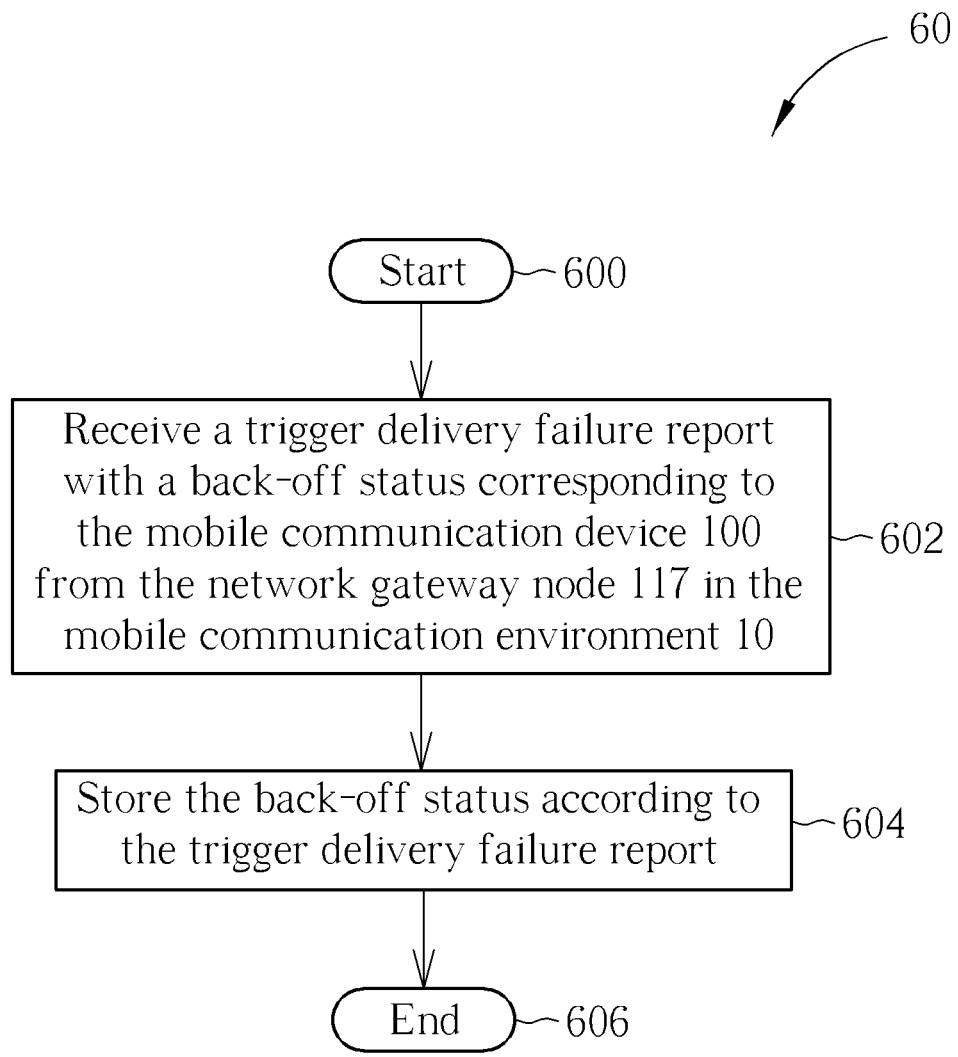

FIG. 6 is a flowchart diagram of an exemplary process 60 of the present invention. The process 60 is used for MTC for handling signaling and data transmission, for example the signaling may be trigger related messages, in the MTC server 120. The process 60 may be compiled into the program code 214, including the following steps:

Step 600: Start.

Step 602: Receive a trigger delivery failure report with a back-off status corresponding to the mobile communication device 100 from the network gateway node 117 in the mobile communication environment 10.

Step 604: Store the back-off status according to the trigger delivery failure report.

Step 606: End.

According to the process 60, when the MTC server 120 receives the trigger delivery failure report with the back-off status from the network gateway node 117, the MTC server 120 stores the back-off status and stop sending trigger request message (if any) to the service network 110. The trigger delivery failure report may have a failure cause (e.g. network congestion or congested APN information) according to the type of NAS level congestion control activated by the network control node 116. Please note that the back-off status indicates the active state by a flag or a back-off timer. That is, before the back-off timer expires, the back-off status is regarded as active. The value of the back-off timer is determined by the network gateway node 117 according to the remaining time of the trigger back-off timer or network load conditions on the network gateway node 117. The back-off timer indicates that trigger request messages to be delivered to the mobile communication device 100 are not allowed by the network control node 116 or the network gateway node 117 in a predetermined time.

If the stored back-off status is active, when the MTC server 120 receives a notification message from the network gateway node 117, which corresponds to the mobile communication device 100 and is without indicating the back-off status, the MTC server 120 may clear the back-off status by setting a flag as inactive or stopping the back-off timer, so that the MTC server 120 can resume sending trigger request messages to the mobile communication device 100 (if any).

When the MTC server 120 sends trigger request for the mobile communication device 100 to the core network 114 via network gateway node 117, network gateway node 117 or network control node 116 may suppress the received trigger request or incoming trigger requests when the network control node 116 or network gateway node 117 is congested.

Figure 7:
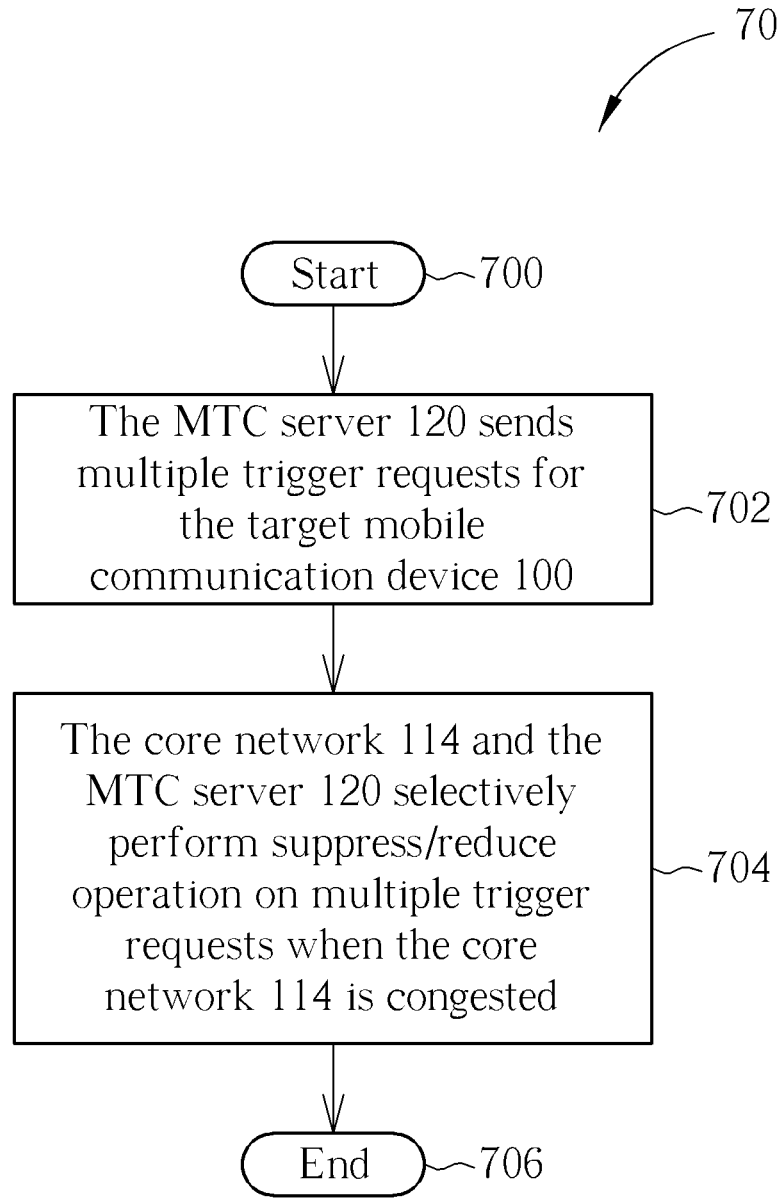

Please refer to FIG. 7, which is a flow chart of an exemplary process 70. The process 70 is used for MTC for handling signaling and data transmission, for example the signaling may be trigger related messages, in the core network 114 or the MTC server 120 in the mobile communication environment 10. The process 70 includes the following steps:

Step 700: Start.

Step 702: The MTC server 120 sends multiple trigger requests for the target mobile communication device 100.

Step 704: The core network 114 and the MTC server 120 selectively perform suppress operation on the multiple trigger requests when the core network 114 is congested.

Step 706: End.

According to the process 70, the MTC server 120 sends multiple trigger requests for the multiple target mobile communication devices 100 via service network 110. The core network 114 or the MTC server 120 selectively perform suppress operation on trigger requests when the core network 114, e.g. network control node 116, network gateway node 117 or PDN gateway node 118, is congested.

The suppress operation can be performed on network gateway node 117 by sending trigger delivery failure report to the incoming trigger request (no trigger request is stored), or stop forwarding the stored trigger requests, or dropping the trigger requests and deleting the stored trigger requests with or without reporting the trigger failure to the MTC server 120, or any combination of above.

The network gateway node 117 should handle the trigger signalling load and prevent the MTC server 120 from sending trigger requests to the mobile communication device 100, causing trigger signalling overload. The network gateway node 117 should detect the trigger signalling load associated with a particular MTC server 120, a specific application identifier, etc. Based on the trigger submission rate policies of the MTC subscription for the MTC server 120 or the load condition of the network gateway node 117, the network gateway node 117 may determine to perform load control on one or more MTC server, e.g. to suppresses trigger load by sending a message M1 over X1 interface to the MTC server 120, where the message M1 may include optional information elements indicating a trigger suppression factor, suppression duration, or the suppression subcategories, e.g. an application identifier, a priority type, a specific MTC server, a specific TCP/UDP port, etc., to adjust the number of triggers sending from the MTC server 120. Also, the network gateway node 117 can report the success or failure of the trigger (e.g. due to network congestion) to the MTC server 120. The MTC server 120 follows received information from the network gateway node 117 and/or follows the trigger submission rate policies of the MTC subscription to control trigger signaling load generated on the network gateway node 117.

To control trigger requests from the network gateway node 117 that generates trigger loads on the network control node 116 (e.g. MME/SGSN/MSC), the overload control can be achieved by the network control node 116 (e.g. MME/SGSN/MSC) invoking the overload control procedure via sending a message M2 over X2 interface to the network gateway node 117, where the message M2 may include optional information elements as trigger suppression settings to adjust the number of triggers sending from the network gateway node 117.

Based on the received message M2 sending from the network control node 116, the network gateway node 117 performs the overload control by suppressing trigger requests, e.g. to stop forwarding the stored trigger requests to the congested network control node 116, to reject the new arrival trigger requests to be delivered via congested network control node 116 and send trigger delivery failure report to the MTC server 120, or to delete the stored trigger requests with reporting the trigger failure to the MTC server 120. When the network gateway node 117 receives the message M2 with information of trigger suppression settings from the network control node 116, it determines if the network congestion occurs and determines to enforce load control on one or more MTC servers to reject the trigger requests from the selected MTC server 120 by sending trigger delivery failure report to the MTC server 120 in responding to the received trigger request which is to be delivered to the network control node 116; it can selectively stops forwarding the trigger requests (queuing or new arriving) to next network node, e.g. SMS-SC or network control node 116; it can selectively dropping the trigger requests and deleting the stored trigger requests with or without sending trigger delivery failure report message to the MTC server 120.

Based on the received message M1 sending from the network gateway node 117, the MTC server 120 performs the load control, e.g. by selectively suppressing trigger requests, e.g. to stop sending specific categories of trigger requests as indicated trigger suppression settings in the message M1 to the network gateway node 117. Alternatively, the MTC server 120 may determine to deliver the trigger request via another selected network gateway node. On the other hand, the network gateway node 117 needs to validate the trigger requests sending from the MTC server 120 based on the trigger suppression settings criteria as indicated in the message M1 to the MTC server 120 and/or the trigger submission rate of the subscription for the MTC server 120. The network gateway node 117 sends a message M3 with a failure cause in response to the received trigger request.

For trigger load control over X1 interface, the network gateway node 117 sends the message M1 over X1 interface with optional information elements (IEs) to adjust the trigger load sending from the MTC server 120. Also, for trigger load/overload control over X2 interface, the network control node 116 sends the message M2 over X2 interface with optional IEs to adjust the trigger load forwarding from the network gateway node 117. The optional IEs in message M1 over X1 interface are determined by the network gateway node 117 and the optional IEs in message M2 over X2 interface are determined by network control node 116, and the optional IEs can include at least one of a trigger-suppressing factor, a trigger-suppressing delay, a triggering-suppressing application identifier, a trigger-suppress-identifier, a group of MTC devices with a specific group identifier, a specific priority type, a particular MTC server, a particular MTC server with a specific TCP (Transmission Control Protocol)port or a specific UDP (User Datagram Protocol)port, a MME identifier, a SGSN identifier, a specific APN (access point name), and a MME identifier or a SGSN identifier associated with a specific APN, etc.

In some examples, for the APN based congestion control, the network control node 116 requests the network gateway node 117 to suppress trigger requests which are associated with a specific APN by sending the message M1 with information of MME/SGSN/MSC identifier and information of the congested APN. For the mobile communication device 100 attached with a specific MME/SGSN/MSC (identified by an MME/SGSN/MSC identifier), the network gateway node 117 can suppress the trigger requests for the mobile communication device 100 if the trigger requests are used for an application associated with a congested APN.

In some examples, the network control node 116 (e.g. MME/SGSN/MSC) requests the network gateway node 117 to suppress 50 percentage trigger requests from the MTC server 120 for 5, minutes, where the 50% is specified in the trigger-suppressing factor and 5 minutes is specified in the trigger-suppressing duration. Further, the network control node 116 can request the network gateway node 117 to suppress a specific application identifier that may cause more traffic load on the core network 114, by specifying in the trigger-suppressing-application-identifier.

During an overload situation, the network control node 116 and the network gateway node 117, however, should attempt to maintain support for trigger deliver service to trigger the mobile communication device 100 for emergency bearer services or high priority services. In other words, the network control node 116 and the network gateway node 117 should not suppress trigger requests for emergency services or high priority services due to network congestion.

The network gateway node 117 may determine when to start and stop performing suppression operation for load control on one or more MTC servers based on the trigger suppression criteria such as: Maximum number of queuing trigger requests; Maximum number of queuing trigger requests associated with a specific group identifier; Maximum number of queuing trigger requests associated with a specific application identifier; Maximum number of queuing trigger requests associated with a particular MTC server; Maximum number of queuing trigger requests associated with a particular MTC server and a specific TCP/UDP port; Maximum arrival rate of trigger requests; Maximum arrival rate of trigger requests associated with a specific group identifier; Maximum arrival rate of trigger requests associated with a specific application identifier; Maximum arrival rate of trigger requests associated to a particular MTC server; Maximum arrival rate of trigger requests associated to a particular MTC server and a specific TCP/UDP port; Maximum service rate of trigger requests; Maximum service rate of trigger requests associated with a specific group identifier; Maximum service rate of trigger requests associated with a specific application identifier; Maximum service rate of trigger requests associated to a particular MTC server; Maximum service rate of trigger requests associated to a particular MTC server and a specific TCP/UDP port. Please note that the network control node 116 can also base on the similar trigger suppression criteria for congestion/overload control on one or multiple network gateway node 117 if the network control node 116 can differentiate the received trigger requests into aforementioned categories. It is noteworthy that other than the trigger load generated on the network control node, the capacity of network control node 116 is also shared by the NAS signaling messages sending from the mobile communication devices, signaling messages from other network control nodes or other network nodes, e.g. Serving gateway (S-GW), packet data network gateway (P-GW), SMS service center (SMS-SC). To prevent network congestion from exacerbated by mobile communication devices that respond to triggers, when enforcing NAS level congestion control, the network control node 116 shall not deliver trigger requests to the mobile communication devices 100 as long as the particular congestion situation remains.

Apart from that, in response to the received trigger request, the network gateway node 117 may send trigger delivery failure report message with a trigger back-off timer for the target mobile communication device 100 (e.g. with MTC identifier) or for a group of mobile communication device 100 (e.g. with MTC group identifier) to the MTC server 120. Based on the timer, the MTC server 120 is not allowed to send subsequent device trigger requests to the same target mobile communication device 100 or a group of MTC devices before the expiry of the timer.

The network gateway node 117 stores the trigger suppression timer associated to the target mobile communication device 100 or a group of mobile communication device 100. Before the expiry of the timer, the network gateway node 117 does not forward the trigger request associated to the suppressed mobile communication device 100 or the network gateway node 117 drops the trigger request of the suppressed mobile communication device 100 even if it receives subsequent trigger requests for the suppressed mobile communication device 100 from the MTC server 120.

Once the network gateway node 117 or network control node 116 is recovering from network congestion/overload situation before the expiry of the suppression delay if indicated in message M1/M2 to the MTC server 120 or the network gateway node 117, the network gateway node 117 or the network control node 116 can resume the forwarding of the trigger request if the validity time of the trigger is not expired by sending a message M3 over X1 interface to MTC server 120 or message M4 over X2 interface to network gateway node 117 including aforementioned optional IEs with new values that may permit more trigger traffic to be delivered. Please note that the message M3/M4 may be a trigger delivery failure report message or an acknowledge message in response to the received trigger request; or a new message indicating start or stop trigger suppression operation.

For the mobile communication device 100 where an IP address is available in the MTC Server 120 and/or network gateway node 117, if network gateway node 117 is aware of the available IP address of the mobile communication device 100, when receiving trigger request from the MTC server 120, the network gateway node 117 can use mobile terminated IP communication via a PDN gateway node 118 (e.g. P-GW) over X3 interface for sending a trigger request to the mobile communication device 100.

If the PDN gateway node 118 detects the overload situation on a specific APN, the PDN gateway node 118 sends a M5 message indicating a "P-GW back-off time" for a specific APN to the network control node 116 or a M6 message indicating "P-GW trigger-suppression time" over X3 interface to the network gateway node 117. Further, one or more optional IEs indicating trigger suppression settings can also be sent for suppression operation, wherein the optional IEs includes at least one of a P-GW identifier, a trigger-suppress-identifier, a group of MTC devices with a specific group identifier, a specific application identifier, a priority type, a particular MTC server, a particular MTC server with a specific TCP/UDP port, a MTC server-specific-triggering-suppressing application identifier, a MTC-Server specific-trigger-suppressing factor, a MTC server specific-trigger-suppressing delay, etc.

As a result, if the network gateway node 117 receives M6 message from the overloaded PDN gateway node 118, it performs trigger suppress operation, based on received trigger suppression settings, to stop delivering trigger request using MT IP communication via PDN gateway node 118. If the network control node 116 receives the M5 message from the overloaded PDN gateway node 118, the network control node 116 sends a message M2 with optional IEs containing information for suppression settings to the network gateway node 117 for trigger suppression operation.

Therefore, the network control node 116/network gateway node 117, PDN gateway node 118, and the MTC server 120 is able to process the trigger suppression operations when network congestion occurs. The network control node 116/network gateway node 117 selectively suppresses a number of trigger requests based on received trigger suppression settings to enforce trigger suppression operation, e.g. send trigger delivery failure report to the new arrival trigger request, stop forwarding the stored trigger requests, dropping the trigger requests and deleting the stored trigger requests with or without reporting the trigger failure to the MTC server.

Furthermore, the aforementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 20.

To sum up, the present disclosure discloses back-off status management mechanism for the network side. After NAS level congestion control is applied, when the network receives a trigger request message from the MTC server or a NAS request message from a mobile communication device or MTC device, the network can send a trigger delivery failure report immediately to the MTC server without queuing the trigger request message, such that the network resource can be saved, and transmission delays of other trigger request messages to other MTC devices can be avoided. In other examples of the present disclosure, the core network can selectively suppress the trigger requests sent by the MTC server 120 when network congestion occurs. The core network sends a reject message, or stops forwarding the trigger requests for the stored trigger requests, or drops the trigger requests and deletes the stored trigger requests without sending reject message or reports the trigger failure to the MTC server. As a result, the signaling overload can be avoided.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling signaling and data transmission for machine-type communication (MTC) in a network control node of a core network of a mobile communication system, the method comprising:

receiving a trigger request message from a network gateway node in the core network, wherein the trigger request message is for triggering a mobile communication device;

sending a trigger delivery failure report to the network gateway node to reject the trigger request message, when the network control node is congested and a back-off status corresponding to the mobile communication device is active; and forwarding the trigger request message to the mobile communication device when the network control node is not congested;

wherein the back-off status is stored and set to be active when the network control node sends a non-access stratum (NAS) reject message with a NAS back-off timer to reject a NAS request message received from the mobile communication device.

2. The method of claim 1, wherein the back-off status is sent with the trigger delivery failure report to the network gateway node.

3. The method of claim 2, wherein the back-off status is a trigger back-off timer corresponding to the NAS back-off timer.

4. A method of handling signaling and data transmission for machine-type communication (MTC) in a network gateway node of a core network of a mobile communication system, the method comprising:

forwarding a first trigger request message received from a MTC server to a network control node of the core network, wherein the first trigger request message is for triggering a mobile communication device;

receiving a first trigger delivery failure report from the network control node when the network control node is congested and a back-off status corresponding to the mobile communication device is active, wherein the first trigger delivery failure report indicates that the mobile communication device is unable to be triggered; and sending a second trigger delivery failure report to the MTC server in response to receiving the first trigger delivery failure report;

wherein the back-off status is stored and set to be active when the network control node sends a non-access stratum (NAS) reject message with a NAS back-off timer to reject a NAS request message received from the mobile communication device.

5. The method of claim 4, wherein the first trigger delivery failure report includes the back-off status, and the method further comprises:

receiving a second trigger request message for triggering the mobile communication device from the MTC server; and sending a third trigger delivery failure report to the MTC server according to the back-off status.

6. The method of claim 5, wherein the back-off status is sent with the third trigger delivery failure report to the MTC server.

* * * * *